Dec. 14, 1965     M. J. LEBOW     3,222,923
WELDER TRANSDUCER
Filed June 9, 1961     2 Sheets-Sheet 1
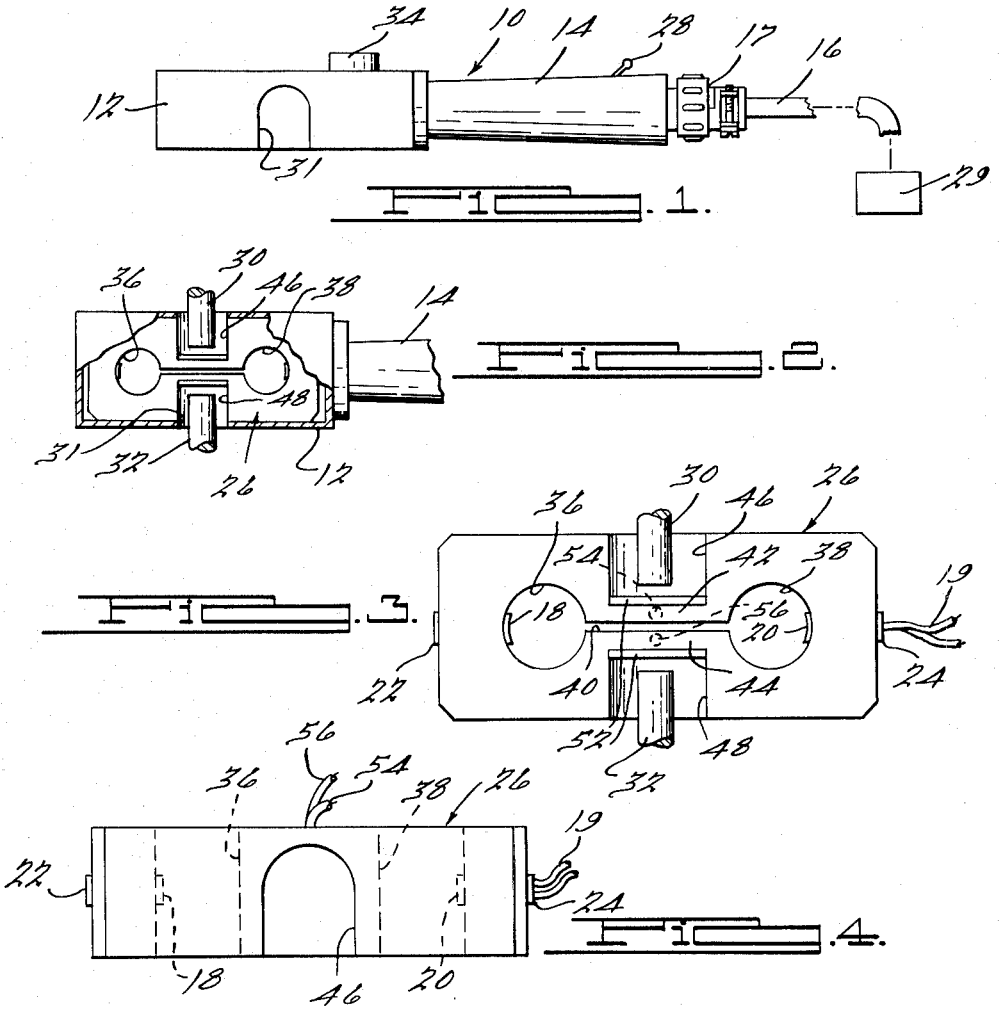
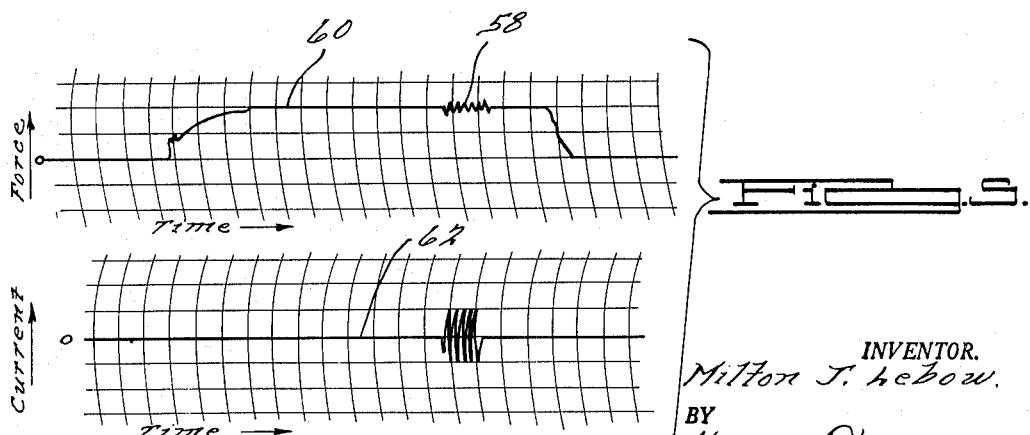
INVENTOR.
Milton J. Lebow.
BY
Harness, Dickey & Pierce
ATTORNEYS.

Dec. 14, 1965 M. J. LEBOW 3,222,923
WELDER TRANSDUCER
Filed June 9, 1961 2 Sheets-Sheet 2
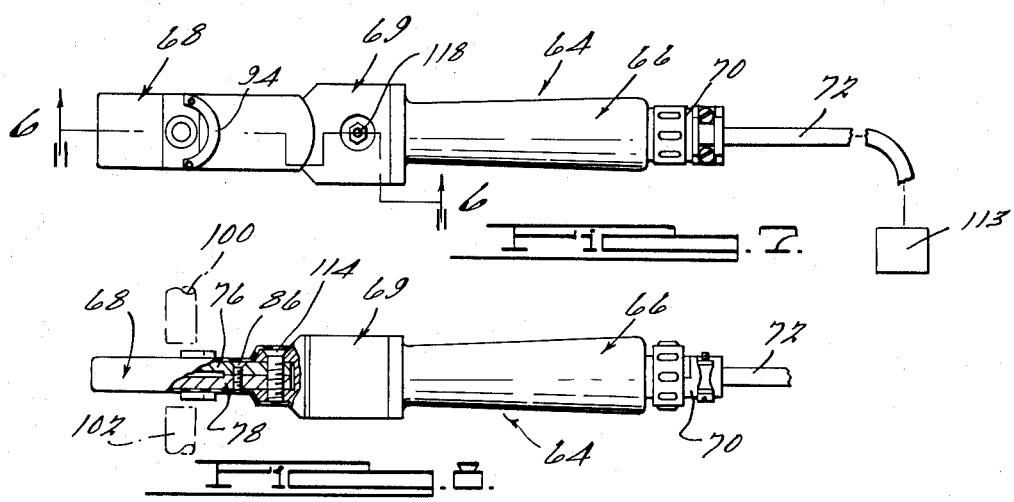
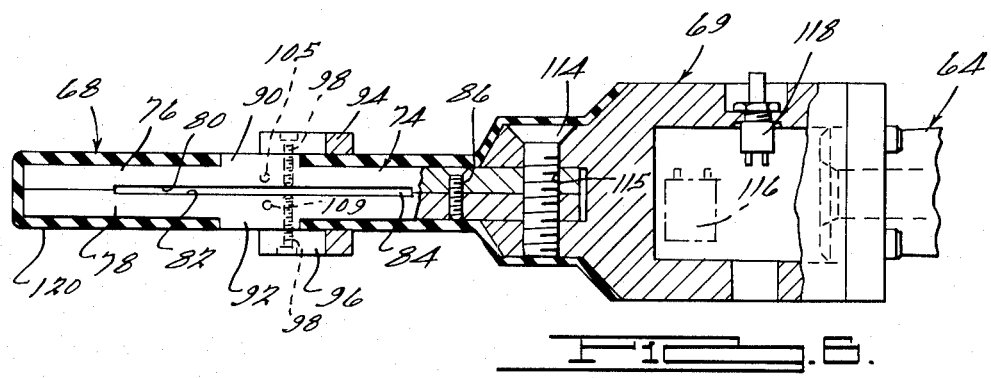
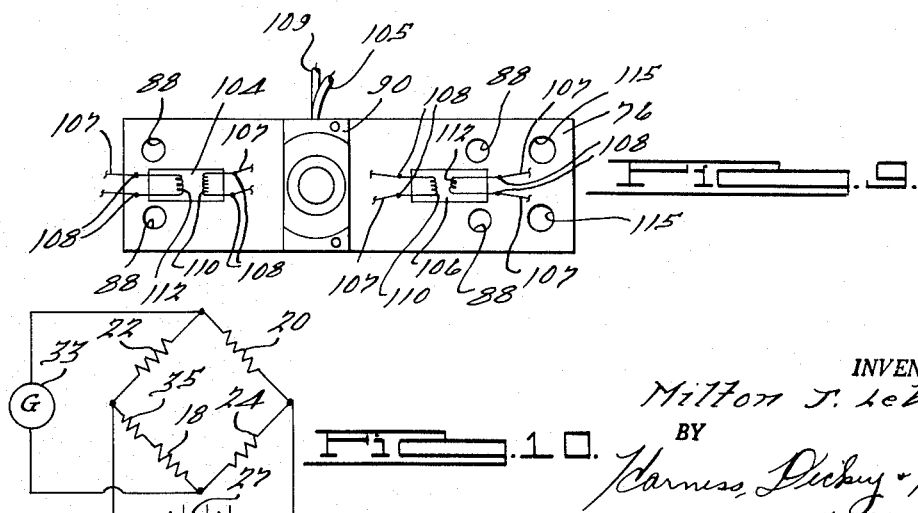

United States Patent Office 3,222,923
Patented Dec. 14, 1965

1

3,222,923
WELDER TRANSDUCER
Milton J. Lebow, Oak Park, Mich., assignor to Lebow
Associates, Inc., Oak Park, Mich., a corporation of
Michigan
Filed June 9, 1961, Ser. No. 116,034
16 Claims. (Cl. 73—141)

This invention relates to pressure transducers and more particularly to portable pressure transducers capable of concurrently sensing welding electrode force and current.

The present invention is directed to an improved pressure transducer probe which is capable of accurately sensing a wide range of forces and currents imposed thereon by welding electrodes. The improved probe is especially suited for use where electrodes are closely gapped as in most production welding operations. The improved probe quickly inserts between electrodes which are closely spaced to give accurate electrode pressure readings without requiring careful adjustment of the electrodes with respect to the transducer probe. Thus, conditions closely approaching production welding conditions are sensed at the time of measurement.

This invention eliminates errors commonly encountered in estimating welding pressures through supply gages and the like. The readings of such gages can vary considerably because of worn or dirty ram slides, worn electrodes, or inaccurate gages.

It is, therefore, a primary object of the present invention to provide an improved welder transducer probe which is capable of concurrently measuring electrode pressure and current under production welding conditions.

A further object of the invention is to provide an improved welder transducer probe which is compact, has a long life, is economical to construct and which accurately senses welding electrode pressure and current.

A further object of the invention is to provide an improved transducer configuration which gives a high strain gage output and accurately senses welding electrode pressure and current flow in production welding setups having comparatively small electrode gaps.

A further object of the invention is to provide an improved welder transducer probe assembly having a portable hand portion for quickly inserting a head portion with respect to a plurality of closely spaced electrodes in a production line setup.

Further objects, features and advantages of this invention will become apparent from a consideration of the following description, the appended claims and the accompanying drawing in which:

FIGURE 1 is a plan view of a welder transducer probe assembly constructed in acordance with the principles of the present invention;

FIG. 2 is an elevational view partially broken away of the head portion of the probe assembly illustrated in FIG. 1;

FIG. 3 is an elevational view of the transducer mounted in the head portion of the probe assembly illustrated in FIGS. 1 and 2;

FIG. 4 is a plan view of the force transducer illustrated in FIG. 3;

FIG. 5 is a graphic representation of the forces and currents sensed by the probe assembly in accordance with the present invention;

FIG. 6 is an enlarged vertical sectional view taken along the line 6—6 of FIG. 7;

FIG. 7 is a plan view of a second embodiment of the invention;

FIG. 8 is an elevational view partially in section, of the probe assembly illustrated in FIG. 7;

FIG. 9 is a plan view of the force transducer portion

2 of the probe assembly illustrated in FIG. 7 with the electrical insulating cover removed; and FIG. 10 is a diagrammatic representation of a bridge circuit containing the strain sensitive force responsive elements of the first embodiment of the invention.

Referring to the drawings, FIGS. 1-4 include a probe assembly generally designated 10 having a head portion 12 and a handle portion 14 suitably connected thereto. A cable clamp 17 connects a conduit 16 to the handle portion 14. The conduit 16 carries electrical conductors for supplying power to strain gages 18, 20, 22, 24, disposed on a transducer portion 26 and for sensing current flow through welding electrodes in a manner to be discussed. The gages 18, 20, 22, 24, are preferably electrical strain gages of the continuous filament bonded wire type. Suitable lead lines similar to lines 19 from strain gage 24 connect terminal points on the strain gages through a switch means 28 and the conduit 16 to a power source and indicating means 29 which in a preferred arrangement included a conventional bridge circuit and voltage sensing means. The switch means 28 extends outwardly from the handle portion 14 of the probe assembly to energize or deenergize the strain gage circuit portion of the assembly.

In FIG. 10 the strain gages 18, 20, 22 and 24 are in the conventional bridge circuit portion of the indicating means 29. Each of the gages 18, 20, 22 and 24 forms one leg of the circuit and pairs of symmetrically located gages 18, 22 and 20, 24 are connected as opposite legs of the circuit. The bridge has a power source 27 and connects to suitable sensing means 33 for indicating the degree to which the gages 18, 20, 22 and 24 are strained.

The transducer portion 26 of the assembly fits inside the head portion 12 so the strain gages distributed over the outer surface of the transducer portion 26 will not contact exterior objects and thereby become damaged.

The head portion 12 of the probe assembly 10 has an opening 31 formed on the side, top and bottom thereof which permits spaced electrodes 30, 32 to engage the transducer portion 26.

A calibration button 34 varies a resistance 35 in the conventional Wheatstone bridge circuit for field calibration of the probe assembly 10.

The transducer portion 26 of the probe assembly 10, best illustrated in FIGS. 3 and 4, is preferably of a good conducting material such as aluminum and includes a first transverse bore 36 and a second tranverse bore 38 in spaced parallelism with the first bore. A transverse groove 40 defined by spaced thin beam portions 42, 44 of the transducer portion 26 interconnects the spaced parallel bores 36, 38. Recesses 46, 48 formed in opposed alignment in the outer surface of the transducer portion 26 guide the spaced electrodes 30, 32 with respect to the probe assembly.

It has been found that strain gages mounted on the inner surfaces of the bores 36, 38 and on the outer end surfaces of the transducer 26 give a high electric output when the electrodes 30, 32 force the beam portions 42, 44 to deflect and thereby deform the inner surface of bores 36, 38 and the outer end surfaces of the transducer 26. Furthermore, it has been found that the electrical output of the strain gages 18, 20, 22 and 24 is essentially independent of the probe's position with respect to the welding electrodes 30, 32. For example, as the electrodes 30, 32 move closer to gages 18, 22 the stress increases therein. Since the strain gages 18, 20, 22 and 24 are symmetrically disposed on the transducer 26, the stress on gages 20, 24 decreases in the same proportion. Since the output signal of the bridge circuit is proportional to the sum of the absolute values of stress in the strain gages the output signal will remain constant. Thus, the improved transducer avoids time consuming alignment of the electrodes 30, 32 with respect to the transducer portion 26.

Replaceable wear plates 52 on the outer surface of the beam portions 42, 44 prevent excessive transducer wear and are preferably of copper or the like to assure a good electrical contact between the electrodes 30, 32 and the transducer portion 26.

In operation, the probe assembly 10 inserts between the spaced electrodes 30, 32. The walls of the top and bottom recesses 46, 48 guide the electrodes 30, 32 into position adjacent the transducer portion 26. Then the electrodes 30, 32 move against the wear plates 52 to deflect the beam portions 42, 44 and strain the gages 18, 20, 22 and 24. The thin transducer mid-portion defined by the recesses 46, 48 and the beam portions 42, 44 enables the insertion of the improved testing assembly in production setups without requiring readjustment of closely spaced electrodes.

On the rearward side of the transducer portion 26 a first conductor 54 fastened to the beam portion 42 and a second conductor 56 fastened to the beam portion 44 of the transducer portion 26 connect to the power cable portion 16 of the probe assembly and suitable sensing means included as a portion of the indicating means 29.

When electrode pressure is applied on the transducer portion 26 of the novel probe assembly, the copper wear plates 52 and transducer portion 26 close the circuit in which the electrodes are disposed causing current to flow therebetween. The first and second conductors 54, 56 have a voltage impressed thereon which is proportional to the current flowing across the transducer portion 26. This voltage is impressed on suitable sensing means as indicated above for measuring the current flow through the electrodes 30, 32. The strain gage circuit switch 28 may also be adapted to selectively interconnect the sensing means to the voltage sensing conductors 54, 56.

Preferably, lead lines such as lead lines 19 from strain gage 24, connecting the strain gages 18, 20, 22 and 24 with the power cable, are not symmetrical with respect to the electrodes 30, 32. The large current that flows through the electrodes 30, 32 creates a magnetic field which induces voltage in these lead lines. If the lead lines are made perfectly symmetrical with respect to the magnetic field induced around the transducer block 26 any plus voltage induced in one-half of the Wheatstone bridge of the load circuit will be counterbalanced by an equal plus signal on the other half of the Wheatstone bridge. These two opposing plus voltages will oppose each other and cancel the magnetic field caused by the large current flow. By unsymmetrically arranging the wiring to the strain gages 18, 20, 22, 24 with respect to the magnetic field created by electrodes 30, 32, the voltages induced in the lead lines will not be equal and the plus voltage induced in one-half of the bridge will be greater than the plus voltage induced in the other half of the bridge. Thus, a disturbance can be created in the signal of the force-indicating circuit (the conventional Wheatstone bridge into which the strain gages are wired) whenever current passes through the transducer portion 26. This disturbance, as shown at 58 in FIG. 5, permits a study of the time relationship between the force and current of welding electrodes on a single channel of recording.

In FIG. 5, the force-current measurement of the novel probe assembly 10 is graphically illustrated. In the top graph, line 60 indicates the force exerted by the electrodes 30, 32 on the transducer portion 26 at a point in time prior to the passage of current through the electrodes 30, 32. At a predetermined time, current passes through the electrodes 30, 32. If the lead wires are unsymmetrical with respect to the electrodes 30, 32, an indication of current flow will occur as at 58 in the top graph. The bottom graph portion of FIG. 5 shows current flow at line 62 which is sensed by a suitable means for measuring the magnitude of current flowing through the electrodes 30, 32.

A second embodiment of the invention, illustrated in FIGS. 6–9, includes a probe assembly, generally designated 64, which has a handle portion 66 and a head portion 68 interconnected by an intermediate adapter portion 69. A cable clamp 70 connects a conduit 72 to the handle portion 66 of the probe assembly 64. The conduit 72 carries suitable conductors for energizing force and current measuring means to be described.

A transducer portion 74 of the probe assembly 64 is preferably a good electrical conductor such as aluminum and includes a pair of upper and lower beams 76, 78 having recessed portions 80, 82, respectively, aligned with one another to form a groove 84 permitting deflection of the thin spaced beam portions defined by those portions of beams 76, 78 which are coextensive with the groove 84. Suitable fastening means such as screws 86 interconnect the ends of the beams 76, 78 through apertures 88 in each end of the beams 76, 78.

Transverse bosses 90, 92, disposed at the mid-portion on the outer surface of each of the beams 76, 78 carry guide collars 94, 96, respectively, fastened thereto by suitable means such as screws 98. The collars 94, 96 on the upper and lower side of the pressure-transducer 74 guide spaced electrodes 100, 102 into operative relationship with the beam portions 76, 78.

Continuous filament type strain gages 104, 106 mounted on the upper face of the pressure-transducer have terminals 108 which interconnect with lead wires 107 which pass through the conduit 72. A first portion 110 of the filament of each of the illustrated strain gages 104, 106 is in a region of high tension and a second portion 112 of the filament of the strain gages 104, 106 is in an area of compression when the beams 76, 78 are deflected by the electrodes 100, 102. The gages 104, 106 connect in a conventional bridge circuit which is the counterpart of the bridge illustrated in FIGURE 10. This embodiment of the invention is also essentially insensitive to electrode position for the reasons as discussed in the first embodiment.

Conductors 105, 109 which extend from the beams 76, 78 respectively, are carried by the conduit 72 and connect to a suitable sensing means included as a portion of the indicating means generally designated 113. The conductors 105, 109 sense voltage in the same manner as the conductors 54, 56 of the first embodiment.

Fastening means such as screws 114 extend through apertures 115 in one end of the beams 76, 78 to connect the transducer 74 to the probe adapter portion 69 which contains a variable resistance 116 for field compensating a conventional bridge circuit in the indicating means 113 in which the strain gages 104, 106 are wired. A switch means 118 in the adapter portion 69 energizes and de-energizes the force and current measuring circuits. A suitable insulating material 120, such as rubber, covers the head portion 68 of the improved portable probe assembly of FIGS. 6–9 except for the raised bosses 90, 92.

It has been found in this case, as in the embodiment illustrated in FIGS. 1–5, that the transducer configuration gives a high strain gage output enabling current flow and electrode pressure to be concurrently measured in an accurate manner. The probe is furthermore adapted to be quickly inserted between closely gapped electrodes since the mid-portion of the head portion 68 has a flat, thin configuration.

From the aforesaid discussion, it is readily apparent that I have provided improved current and force-measuring transducers especially suited for use in production welding assembly lines having many closely gapped electrodes requiring a high degree of control to produce acceptable products.

It will be understood that the specific embodiments of the improved welding electrode transducers which are herein disclosed and described are presented for purposes of explanation and illustration and are not intended to indicate limits of the invention, the scope of which is defined by the following claims.

What is claimed is:

1. A pressure-current sensing probe comprising a one-piece transducer body, said body having a flat elongated cavity formed in a medial portion thereof, the opposite sides of said body adjacent said cavity being deformable toward each other within said cavity, force-responsive strain gages on said transducer body adjacent said cavity for sensing the degree to which said deflectable side portion deforms, and means on said deflectable side portions of said transducer body for concurrently sensing a voltage drop across said transducer body which has a magnitude which varies in accordance with the variations in the magnitude of the current flow across said transducer body.

2. A pressure-current sensing probe comprising a one-piece transducer body, said body having a flat elongated cavity formed in a medial portion thereof, the opposite sides of said body adjacent said cavity being deformable toward each other within said cavity, strain gages symmetrically disposed on said deflectable side portions of said transducer body for sensing the degree to which said deflectable side portions deform, and means on said deflectable side portions of said transducer body for concurrently sensing current flow across said transducer body.

3. A pressure-current sensing probe comprising a one-piece transducer body having first and second thin beam portions and end portions integrally connecting the adjacent ends of said beam portions, said thin beam portions having a mid-portion insertable between closely gapped welding electrodes, means on said transducer for sensing a voltage drop across said transducer body which has a magnitude varying in accordance with variations in the magnitude of the current flow through said electrodes, and force-responsive means on said end portions of said transducer body for sensing the degree to which said first and second beam portions deflect.

4. A pressure-current sensing probe comprising a transducer body having integral therewith first and second thin beam portions in spaced parallelism with each other, said thin beam portions having a mild-portion insertable between closely gapped welding electrodes, circuit means including force-responsive means on said transducer for sensing the degree to which said first and second beam portions deflect, said circuit means further including lead lines for connecting said force-responsive means to a power source and being substantially non-symmetrical with respect to each other to induce an unbalanced voltage within sai dcircuit means for indicating the time relationship between the electrode force on said transducer body and the current flow through said electrodes.

5. A pressure-current sensing probe comprising a transducer body having a first beam including a first recessed portion and a second beam having a second recessed portion overlying said first recessed portion, means rigidly fastening the ends of said first and second beams together, means adjacent said first and second beams for aligning welding electrodes with respect to said and second beams, strain gage means on said beams sensing the degree to which said first and second beams deflect, and means on said transducer body for concurrently sensing a voltage drop across said transducer body which is proportional to current flow across said transducer body.

6. A pressure current sensing probe comprising a transducer body having a first beam including a first recessed portion and a second beam having a second recessed portion overlying said first recessed portion, means rigidly fastening the ends of said first and second beams together, a first boss on the outer surface of said first beam, a second boss on the outer surface of said second beam opposite said first boss, guide means on said first and second bosses for locating welding electrodes with respect to said first and second bosses, said transducer body having a thin mid-portion including said bosses insertable between closely gapped welding electrodes without interfering with production, means on said transducer body for sensing a voltage drop across said transducer body which is proportional to the current flow through said electrodes, and strain gage means on said beams sensing the degree to which said first and second beams deflect.

7. A pressure-current sensing probe comprising a transducer body having a first beam including a first recessed portion and a second beam having a second recessed portion overlying said first recessed portion, means rigidly fastening the ends of said first and second beams together, a first boss on the outer surface of said first beam, a second boss on the outer surface of said second beam opposite said first boss, guide means on said first and second bosses for locating welding electrodes with respect to said first and second bosses, circuit means including strain gage means on the outer surface of said first and second beams sensing the degree to which said beams deflect, lead lines connecting said strain gage means to a power source, and means including said lead lines inducing a disturbance in said circuit means for indicating the time lapse between application of electrode force on said transducer body and current flow through said electrodes.

8. A pressure-current sensing probe comprising a transducer body, means defining a first bore through said transducer body, means defining a second bore through said transducer body in spaced parallelism with said first bore, means defining a groove in said transducer body connecting said first and second bores, the outer surface of said transducer body having a first recess, the side of said transducer body opposite said first recess having a second recess, first force-responsive strain gages on the inner surface of said first and second bores, second force-responsive strain gages on the outer surface of said transducer body, means including said recesses guiding welding electrodes into a force-flexing relationship with said transducer body to strain said first and second force-responsive strain gages, and means on said transducer body for concurrently sensing a voltage drop across said transducer body which is proportional to current flow through said electrodes.

9. A pressure-current sensing probe comprising a transducer body, means defining a first bore through said transducer body, means defining a second bore through said transducer body in spaced parallelism with said first bore, means in said body including a first beam portion and a second beam portion in spaced parallelism defining a groove in said transducer body connecting said first and second bores, the outer surface of said transducer body having a first recess, the side of said transducer body opposite said first recess having a second recess, first force-responsive strain gages on the inner surface of said first and second bores, second force-responsive strain gages on the outer surface of said transducer body, means including said recesses guiding welding electrodes into a force-flexing relationship with said spaced beam portions to strain said first and second force-responsive strain gages, and means on said transducer body for concurrently sensing a voltage drop across said transducer body which is proportional to the current flow through said electrodes.

10. A pressure-current sensing probe comprising a transducer body, means defining a first bore through said transducer body, means defining a second bore through said transducer body in spaced parallelism with said first bore, means defininig a groove in said transducer body connecting said first and second bores, the outer surface of said transducer body having a first recess, the side of said transducer body opposite said first recess having a second recess, circuit means including first force-responsive strain gages on the inner surface of said first and second bores and second force-responsive strain gages on the outer surface of said transducer body, means including said recesses guiding welding electrodes into a force-flexing relationship with said transducer body to strain said first and second force-responsive strain gages, lead lines connecting said strain gages to a power source, and means including said lead lines inducing a disturbance in said circuit means for indicating the time lapse between the application of electrode force on said transducer body and current flow through said electrodes.

11. A pressure-current sensing probe comprising a head portion, a handle portion, a transducer body having a groove extending between a pair of vertically extending, longitudinally spaced parallel bores, said transducer body having first and second transversely extending recesses for receiving and guiding welding electrodes into a force-deflecting relationship with that portion of said transducer body disposed between said bores, a pair of conductor-were plates disposed within said first and second recesses, circuit means including a first pair of force-responsive strain gages symmetrically disposed on the inner surfaces of said bores and a second pair of force-responsive strain gages disposed on the outer surface of said transducer body, said first and second pairs of force-responsive strain gages operably responsive to sense the deflection of that portion of said transducer body disposed between said bores, said circuit means further including lead lines connecting said force-responsive strain gages to a power source and being substantially non-symmetrical with respect to each other to induce an unbalanced voltage within said circuit means for indicating the time relationship between the electrode force on said transducer body and the curent flow through said electrodes.

12. A pressure-current sensing probe comprising a head portion, a handle portion, a transducer body in said head portion having first and second beams, said first beam having a first longitudinally extending recess, said second beam having a second longitudinally extending recess disposed in confrontation with said first recess, means rigidly fastening the ends of said first and second beams together, a first boss on the outer surface of said first beam and a second boss on the outer surface of said second beam opposite said first boss, a semi-circular guide collar on said first boss for guiding closely gapped welding electrodes onto said first and second bosses and into a force deflecting relationship with said first and second beams, circuit means including a pair of force-responsive strain gages disposed on the outer surface of said first beam for sensing the deflection of said first beam, said circuit means further including lead lines connecting said force-responsive strain gages to a power source and being substantially non-symmetrical with respect to each other to induce an unbalanced voltage within said circuit means for indicating the time relationship between the electrode force on said transducer body and the current flow through the electrodes, and a pair of conductors connected to said first and second beams on opposite sides of the cavity defined by said first and second recesses to sense the voltage drop thereacross.

13. A pressure-current sensing probe comprising a transducer body having a first bore and a second bore disposed in a spaced parallel relationship to said first bore, said transducer body having first and second thin beam portions disposed in spaced parallelism with each other and extending longitudinally between said first and second bores and being insertable between closely gapped welding electrodes, circuit means including force-responsive means disposed within said first and second bores for sensing the degree to which said first and second beam portions deflect, said circuit means further including lead lines for connecting said force-responsive means to a power source and being substantially non-symmetrical with respect to each other to induce an unbalanced voltage within said circuit means for indicating the time relationship between the electrode force on said transducer body and the current flow through said electrodes.

14. A pressure-current sensing probe comprising a transducer body having a first bore and a second bore disposed in a spaced parallel relationship to said first bore, said transducer body having first and second thin beam portions disposed in spaced parallelism with each other and extending longitudinally between said first and second bores and being insertable between closely gapped welding electrodes, means on said transducer body for providing an output signal having a magnitude varying in accordance with variations in the magnitude of the current flow through said electrodes, circuit means including force-responsive means disposed within said first and second bores for sensing the degree to which said first and second beam portions deflect, said circuit means further including lead lines for connecting said force-responsive means to a power source and being substantially non-symmetrical with respect to each other to induce an unbalanced voltage within said circuit means for indicating the time relationship between the electrode force on said transducer body and the current flow through said electrodes.

15. A pressure-current sensing probe comprising a head portion, a transducer body in said head portion, means in said head portion permitting access to said transducer body, said transducer body having first and second thin beam portions in spaced parallelism with each other, said thin beam portions having a mid-portion insertable between closely gapped welding electrodes, force-responsive strain gages on said transducer body sensing the degree to which said first and second beam portions deflect, and means on said transducer body for concurrently sensing a voltage drop across said transducer body and for providing an output signal having a magnitude varying in accordance with variations in the magnitude of the current flow through said electrodes.

16. A pressure-current sensing probe comprising a head portion, a handle portion, and an adapter interconnecting said head and handle portions, a transducer body in said head portion having a first beam including a first recessed portion and a second beam having a second recessed portion overlying said first recessed portion, means rigidly fastening the ends of said first and second beams together, a first boss on the outer surface of said first beam, a second boss on the outer surface of said second beam opposite said first boss, guide means on said first and second bosses for locating welding electrodes with respect to said first and second bosses, said transducer body having a mid-portion including said bosses insertable between closely gapped welding electrodes without interfering with production, means on said transducer for sensing a voltage drop across said transducer which is proportional to the current flow through said electrodes, and strain gage means on the outer surface of said beams sensing the degree to which said first and second beams deflect.

References Cited by the Examiner

UNITED STATES PATENTS

| 2,430,237 | 11/1947 | Moncher | 219—110 |
| 2,992,556 | 7/1961 | Webster | 73—88.5 X |
| 3,024,648 | 3/1962 | Webster | 73—141 |

FOREIGN PATENTS

| 1,067,241 | 10/1959 | Germany. |
| 723,366 | 2/1955 | Great Britain. |

RICHARD C. QUEISSER, *Primary Examiner.*

ROBERT EVANS, JOSEPH P. STRIZAK, *Examiners.*